W. W. BALDWIN.

MAGAZINE STOVE.

No. 7,007.

Reissued March 21, 1876.

WITNESSES

E. J. Nottingham

F. O. McCleary

INVENTOR

William W. Baldwin.

By Leggett & Leggett.

Attorneys.

N. PETERS, PHOTO-LITHOGRAPHER, WASHINGTON, D. C.

UNITED STATES PATENT OFFICE

WILLIAM W. BALDWIN, OF CLEVELAND, OHIO.

IMPROVEMENT IN MAGAZINE-STOVES.

Specification forming part of Letters Patent No. 163,442, dated May 18, 1875; reissue No. 6,845, dated January 11, 1876; reissue No. 6,928, dated February 15, 1876; reissue No. 7,007, dated March 21, 1876; application filed March 13, 1876.

*To all whom it may concern:*

Be it known that I, WILLIAM W. BALDWIN, of Cleveland, in the county of Cuyahoga and State of Ohio, have invented certain new and useful Improvements in Stoves; and I do hereby declare the following to be a full, clear, and exact description of the invention, such as will enable others skilled in the art to which my invention relates to make and use it, reference being had to the accompanying drawings, which form a part of this specification.

My invention relates to an improvement in stoves designed for heating apartments, and is so fully described in the following description and claims that no preliminary recital is needed.

Figure 1:
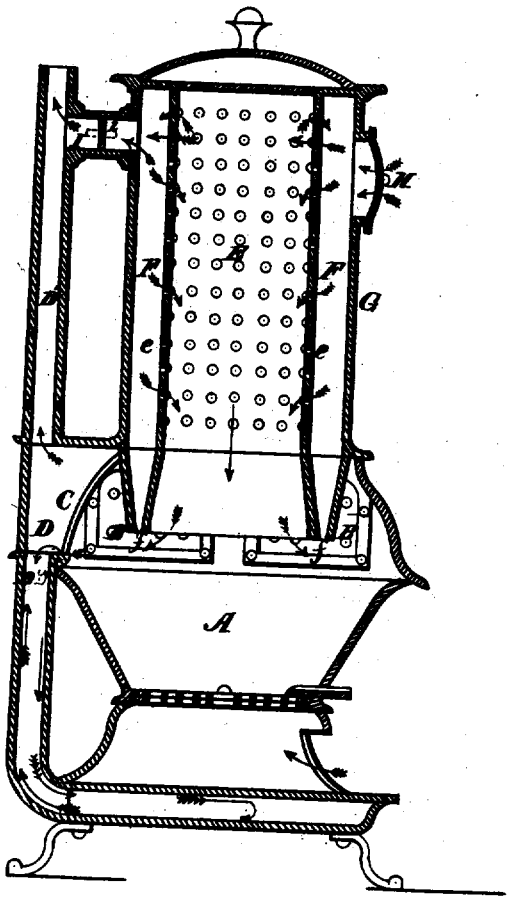
Figure 2:
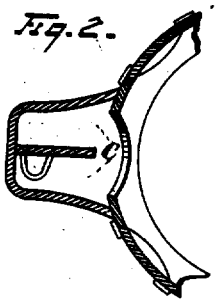

In the drawings, Figure 1 is a longitudinal vertical section of a stove embodying my invention. Fig. 2 is a detached view, showing in plan section the opening C at the base of the exit-flue.

A is the fire-pot; B, the combustion-chamber; C, the exit-flue, leading to the smoke-flue. D is the smoke-flue. It may or may not be provided with divisions D′ D″, whereby the products of combustion may be made to descend, circulate about the ash-pit, and ascend into the smoke-flue D, which, however, forms no part of my invention. E is the fuel-reservoir. It is provided with perforations or slots *e*. F is an air-space left between the perforated wall of the reservoir and outer wall G of the drum-section of the stove. H is a register for admitting external air. I is a flue leading from the air-chamber F into the smoke-flue D. *i* is a damper. *f* is a diminished orifice, through which dust and ashes that may collect in the chamber F are discharged into the combustion-chamber B.

The operation of the device is as follows: Fuel contained in the fuel-reservoir E will, when the stove is well heated, emit gases in the process of coking the fuel in the magazine. These gases will escape into the room, and become not only obnoxious, but will be wasted, unless means are provided for their escape or consumption. This desideratum is accomplished by the provision of the perforations *e* made through the magazine, whereby the draft, as shown by the arrows in the drawing, is directed from the air-space F into the magazine E, whence it passes down through the fuel, assisting in coking the same before it reaches the fire-pot A. The opening or orifice *f* at the bottom of the air-chamber F is not intended at all to facilitate the draft, the only practical function of the opening *f* being to permit the escape of dirt or the like that might collect in the chamber F.

It has been found by practical test that the draft and entire functions of the stove are not at all affected by the opening *f*, but continue the same whether the said opening is provided or not.

To assist the draft from without to within the magazine A, and at the same time to furnish more oxygen, a register, H, is provided, whereby the external air can be thus admitted and employed.

When it is desired to diminish the heat of the stove, and for that purpose quell the combustion in the combustion-chamber B, the damper *i* in the flue I is opened, and the gas in the chamber permitted to escape directly into the smoke-flue D, instead of being made to pass down through the fuel in the magazine, as would otherwise be the case.

It will be noticed that the outer wall G of the drum-section of the stove forms the outer wall of the air-chamber F, and this outer wall or drum is dropped down into the combustion-chamber, so as, by its continuation, to diminish the air-space F at its base, and form the contracted opening *f* for the escape of ashes, dirt, and the like from the air-space, as heretofore mentioned.

I am not aware that a stove provided with such a perforated reservoir and air-space F has ever before been provided with a flue, I, and with or without a damper, *i*, and I am not aware that a stove of this description has ever before been made with a fuel-reservoir, and a smoke-flue, D, leading therefrom, the opening C into said flue extending below the base of the said fuel-reservoir, whereby the smoke-flue within the limits of the stove is made to form a portion of the combustion-chamber.

It should be observed that the register H is so located with respect to the perforated reservoir that gases escaping through the perforations will rise into the space above the register H, and when the register H is opened, the draft passing in through it will catch up this escaped gas, and, mixing with it, will pass it down through the fuel in the reservoir, and finally into the combustion-chamber in a sufficiently oxygenized condition to be consumed therein before reaching the escape-flue.

It should be observed, further, that the object of this invention is to coke the coal in the magazine, so that it shall be delivered into the combustion-chamber in the form of coke; and the construction of the stove is such, as will readily be seen, that all the gases that escape from the magazine in the process of coking will be oxygenized and burned, and, consequently, utilized in the combustion-chamber; and the object and function of the air-space around the fuel-reservoir is to effect this coking of the coal and the combustion of the gases, and not, as has heretofore been practiced, to keep the fuel cool, and thus prevent coking, so as to deliver the coal in its natural condition into the reservoir.

It should be observed, finally, that the flue I and damper *i* serve the following purposes, among others: If the mica doors are dropped down, or, in other words, opened, the gases concentrated from the magazine in the upper part of the stove would escape into the apartment. So, also, if the top of the stove should be opened, a like result would ensue; but, by opening the damper *i* at such time, the gases, instead of escaping into the room, would pass into the smoke-flue.

What I claim is—

1. In a magazine-stove, the combination, with the converging walls of the air-space, the same forming at their lower extremity the annular space *f*, of the opening C, constructed to extend above and below the lower portion of said converging walls, substantially as and for the purpose set forth.

2. The combination, with perforated reservoir E, the perforations of which communicate directly with the air-space, and the air-space F, of the flue I and damper *i*, substantially as and for the purpose described.

3. The combination, with the perforated reservoir E, the perforations of which connect directly with the air-space F, of air-space F, flue I, and air-register H, substantially as and for the purpose described.

4. The combination, with the combustion-chamber B and perforated reservoir E, the perforations of which communicate directly with the air-space F, of the exit-flue C and flue I, substantially as and for the purpose described.

5. The combination, with the combustion-chamber B, air-space F, and flues C and I, of the air-register H, by which means the draft has direct transit through the reservoir E without passing down by an indirect course, substantially as and for the purpose described.

6. The combination, with the annular air-space and the fuel-reservoir, having perforated wall, of the flue I, leading to the smoke-flue D, substantially as and for the purpose set forth.

In testimony whereof I have signed my name to this specification in presence of two subscribing witnesses.

WILLIAM W. BALDWIN.

Witnesses:
FRANCIS TOUMEY,
EDWARD WALSH.